United States Patent
Zhang et al.

(10) Patent No.: US 12,256,429 B2
(45) Date of Patent: Mar. 18, 2025

(54) TRANSMISSION CONFIGURATION INDICATOR (TCI) SWITCHING USING LISTEN BEFORE TALK (LBT) COUNTERS

(71) Applicant: ZTE CORPORATION, Guangdong (CN)

(72) Inventors: Li Zhang, Shenzhen (CN); Ruiqi Liu, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 378 days.

(21) Appl. No.: 17/848,995

(22) Filed: Jun. 24, 2022

(65) Prior Publication Data
US 2022/0322433 A1 Oct. 6, 2022

Related U.S. Application Data

(63) Continuation of application No. PCT/CN2020/091270, filed on May 20, 2020.

(51) Int. Cl.
*H04W 74/0808* (2024.01)
*H04L 5/00* (2006.01)

(52) U.S. Cl.
CPC ....... *H04W 74/0808* (2013.01); *H04L 5/0048* (2013.01); *H04L 5/0094* (2013.01); *H04L 5/0098* (2013.01)

(58) Field of Classification Search
CPC ............. H04W 74/0808; H04W 72/23; H04W 72/1273; H04W 72/046; H04W 74/0833; H04L 5/0048; H04L 5/0094; H04L 5/0098; H04L 5/0035; H04L 5/001; H04L 5/0053; H04L 41/0654; H04B 7/0695; H04B 7/088
See application file for complete search history.

(56) References Cited

U.S. PATENT DOCUMENTS

| 2019/0141693 | A1 | 5/2019 | Guo et al. |
| 2019/0174466 | A1 | 6/2019 | Zhang et al. |
| 2019/0222289 | A1 | 7/2019 | John Wilson et al. |
| 2021/0194756 | A1* | 6/2021 | Babaei .................. H04B 7/088 |
| 2021/0378045 | A1* | 12/2021 | Zhang .................. H04W 76/25 |
| 2022/0399983 | A1* | 12/2022 | Muruganathan ...... H04L 5/0098 |
| 2023/0023600 | A1* | 1/2023 | Cirik .................. H04W 52/242 |

(Continued)

FOREIGN PATENT DOCUMENTS

| CN | 109076560 A | 12/2018 |
| CN | 110446252 A | 11/2019 |
| CN | 110785958 A | 2/2020 |

OTHER PUBLICATIONS

WO 2020/164369 A1 (Year: 2020).*
WO 2020/033406 A2 (Year: 2020).*
U.S. Appl. No. 63/008,389, filed 2020.*

(Continued)

*Primary Examiner* — Rushil P. Sampat
(74) *Attorney, Agent, or Firm* — Foley & Lardner LLP

(57) ABSTRACT

Presented are systems, methods, apparatuses, or computer-readable media for transmission configuration indicator (TCI) switching using listen before talk (LBT) counters. A wireless communication device in an active TCI switching procedure may receive a physical data shared channel with an activation command. The wireless communication device may determine that a target TCI state is absent from an active TCI state list of the physical data shared channel. The wireless communication device may determine whether the target TCI state is known.

20 Claims, 4 Drawing Sheets

(56) References Cited

U.S. PATENT DOCUMENTS

2023/0127381 A1* 4/2023 Gao ............... H04W 72/1273 370/329
2024/0154773 A1* 5/2024 Sun ...................... H04B 7/0695

OTHER PUBLICATIONS

Ericsson, "On TCI state known condition" 3GPP TSG RAN WG4 Meeting #92, R4-1909595. Aug. 30, 2019, Ljubljana, Slovenia (3 pages).

Extended European Search Report for EP Appl. No. 20897239.8, dated Dec. 6, 2022 (12 pages).

Moderator (Ericsson), "Email discussion summary for [94e Bis][104] NR_unlic_RRM_Core_Part_ 1", 3GPP TSG-RAN WG4 Meeting# 94-e-Bis, R4-2005236, Apr. 30, 2020, e-Meeting (45 pages).

Huawei et al.: "Two-step RACH procedure for NR-U" 3GPP TSG-RAN WG2 Meeting #104; R2-1816617; Nov. 16, 2018; Spokane, USA (4 pages).

International Search Report and Written Opinion for PCT Appl. No. PCT/CN2020/091270, mailed Feb. 10, 2021 (9 pages).

Ericsson, "LS on UE declaring beam failure due to LBT failures during active TCI switching", 3GPP TSG RAN WG1 #101-e, R1-2003271, Jun. 5, 2020, e-Meeting (2 pages).

Ericsson, "On active TCI state switching requirements in NR-U", 3GPP TSG-RAN WG4 Meeting #94-e, R4-2001931, Mar. 6, 2020, Electronic Meeting (6 pages).

Ericsson, "On active TCI state switching requirements in NR-U", 3GPP TSG-RAN WG4 Meeting #95-e, R4-2007969, Jun. 5, 2020, Electronic Meeting (5 pages).

First Office Action for CN Appl. No. 202080100732.2, dated Sep. 27, 2024 (with English translation, 11 pages).

* cited by examiner

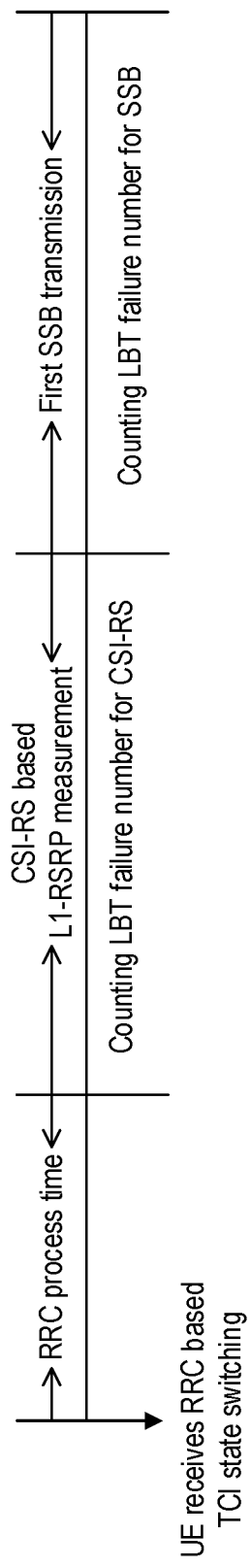
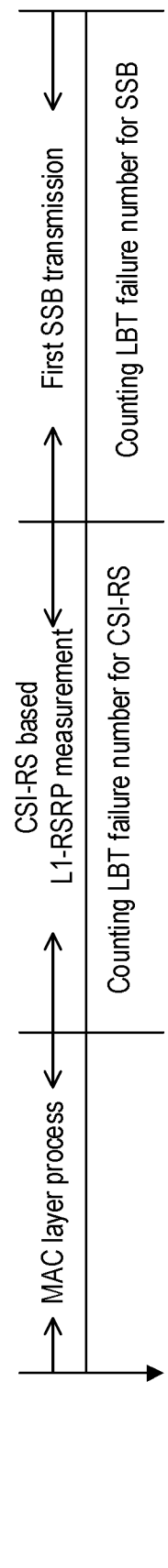
FIG. 3
FIG. 4

TRANSMISSION CONFIGURATION INDICATOR (TCI) SWITCHING USING LISTEN BEFORE TALK (LBT) COUNTERS

CROSS-REFERENCE TO RELATED APPLICATION

This application claims the benefit of priority under 35 U.S.C. § 120 as a continuation of PCT Patent Application No. PCT/CN2020/091270, filed on May 20, 2020, the disclosure of which is incorporated herein by reference in its entirety.

TECHNICAL FIELD

The disclosure relates generally to wireless communications, including but not limited to systems and methods for transmission configuration indicator (TCI) switching using listen before talk (LBT) counters.

BACKGROUND

The standardization organization Third Generation Partnership Project (3GPP) is currently in the process of specifying a new Radio Interface called 5G New Radio (5G NR) as well as a Next Generation Packet Core Network (NG-CN or NGC). The 5G NR will have three main components: a 5G Access Network (5G-AN), a 5G Core Network (5GC), and a User Equipment (UE). In order to facilitate the enablement of different data services and requirements, the elements of the 5GC, also called Network Functions, have been simplified with some of them being software based so that they could be adapted according to need.

SUMMARY

The example embodiments disclosed herein are directed to solving the issues relating to one or more of the problems presented in the prior art, as well as providing additional features that will become readily apparent by reference to the following detailed description when taken in conjunction with the accompany drawings. In accordance with various embodiments, example systems, methods, devices and computer program products are disclosed herein. It is understood, however, that these embodiments are presented by way of example and are not limiting, and it will be apparent to those of ordinary skill in the art who read the present disclosure that various modifications to the disclosed embodiments can be made while remaining within the scope of this disclosure.

At least one aspect is directed to a system, method, apparatus, or a computer-readable medium. A wireless communication device in an active transmission configuration indicator (TCI) switching procedure may receive a physical data shared channel with an activation command. The wireless communication device may determine that a target TCI state is absent from an active TCI state list of the physical data shared channel. The wireless communication device may determine whether the target TCI state is known.

In some embodiments, the activation command may include a radio resource control (RRC) activation command that includes one TCI state in the active TCI state list. In some embodiments, the activation command may include a medium access control control element (MAC CE) activation command.

In some embodiments, when the target TCI state is known, the wireless communication device may that determine a first counter has reached a defined limit. The first counter may count a number of listen-before-talk (LBT) failures in a synchronization signal block (SSB) period. In some embodiments, the wireless communication device may increment, responsive to the first counter reaching the defined limit, a second counter. In some embodiments, the wireless communication device may set, responsive to the incrementing, the first counter to zero.

In some embodiments, the wireless communication device may indicate to a lower layer, to stop the active TCI state switching procedure when the SSB period is less than or equal to a defined time duration and the second counter exceeds a first threshold, or when the SSB period is more than the defined time duration and the second counter exceeds a second threshold.

In some embodiments, when the second counter exceeds one of a first threshold or a second threshold, the wireless communication device may trigger beam failure recovery. In some embodiments, the wireless communication device may switch to at least another downlink bandwidth part (BWP) configured or indicated by a network. In some embodiments, the wireless communication device may switch to a specified BWP. In some embodiments, the wireless communication device may indicate to the network via a radio resource control (RRC) or medium access control control element (MAC CE) message, a TCI state switching failure.

In some embodiments, the wireless communication device may set the first counter and the second counter to zero, responsive to receiving a success indication for an available SSB associated with the target TCI state. In some embodiments, the wireless communication device may increment the wireless communication device, a first counter responsive to receiving a listen-before-talk (LBT) failure indication from a lower layer. The first counter may count a number of LBT failures in a synchronization signal block (SSB) period.

In some embodiments, when the target TCI state is unknown and the active TCI state switching procedure is associated with quasi-co-location (QCL) Type D, the wireless communication device may determine that a first counter has reached a defined limit. The first counter may count a number of listen-before-talk (LBT) failures in a synchronization signal block (SSB) period. In some embodiments, the wireless communication device may increment responsive to the first counter reaching the defined limit, a second counter. In some embodiments, the wireless communication device may set, responsive to the incrementing, the first counter to zero.

In some embodiments, the wireless communication device may indicate, to a lower layer, to stop the active TCI state switching procedure when the SSB period is less than or equal to a defined time duration and the second counter exceeds a first threshold, or when the SSB period is more than the defined time duration and the second counter exceeds a second threshold.

In some embodiments, the wireless communication device may set the first counter and the second counter to zero, responsive to receiving a success indication for an available SSB associated with the target TCI state.

In some embodiments, when the target TCI state is unknown and the active TCI state switching procedure is associated with quasi-co-location (QCL) Type D, the wireless communication device may increment a third counter responsive to receiving a listen-before-talk (LBT) failure indication from a lower layer. The third counter may count a number of LBT failures in a channel state information reference signal (CSI-RS) transmission.

In some embodiments, the wireless communication device may indicate, to a lower layer, to stop the active TCI state switching procedure when the CSI-RS period is less than or equal to a defined time duration and the third counter exceeds a third threshold, or when the CSI-RS period is more than the defined time duration and the third counter exceeds a fourth threshold. In some embodiments, the wireless communication device may set the third counter to zero, responsive to receiving a success indication for an available CSI-RS associated with the target TCI state.

In some embodiments, the wireless communication device may determine that a first counter has reached a defined limit, wherein the first counter is configured to count a number of listen-before-talk (LBT) failures in a synchronization signal block (SSB) period. In some embodiments, the wireless communication device may increment, responsive to the first counter reaching the defined limit, a second counter. In some embodiments, the wireless communication device may set, responsive to the incrementing, the first counter to zero.

In some embodiments, the wireless communication device may indicate, to a lower layer, to stop the active TCI state switching procedure when the SSB period is less than or equal to a defined time duration and the second counter exceeds a first threshold, or when the SSB period is more than the defined time duration and the second counter exceeds a second threshold. In some embodiments, the wireless communication device may set the first counter and the second counter to zero, responsive to receiving a success indication for an available SSB associated with the target TCI state.

BRIEF DESCRIPTION OF THE DRAWINGS

Various example embodiments of the present solution are described in detail below with reference to the following figures or drawings. The drawings are provided for purposes of illustration only and merely depict example embodiments of the present solution to facilitate the reader's understanding of the present solution. Therefore, the drawings should not be considered limiting of the breadth, scope, or applicability of the present solution. It should be noted that for clarity and ease of illustration, these drawings are not necessarily drawn to scale.

FIG. 3 illustrates a timing diagram of radio resource control (RRC) based transmission configuration indicator (TCI) switching procedure;

FIG. 4 illustrates a timing diagram of media access control, control element (MAC-CE) based transmission configuration indicator (TCI) switching procedure.

DETAILED DESCRIPTION

Various example embodiments of the present solution are described below with reference to the accompanying figures to enable a person of ordinary skill in the art to make and use the present solution. As would be apparent to those of ordinary skill in the art, after reading the present disclosure, various changes or modifications to the examples described herein can be made without departing from the scope of the present solution. Thus, the present solution is not limited to the example embodiments and applications described and illustrated herein. Additionally, the specific order or hierarchy of steps in the methods disclosed herein are merely example approaches. Based upon design preferences, the specific order or hierarchy of steps of the disclosed methods or processes can be re-arranged while remaining within the scope of the present solution. Thus, those of ordinary skill in the art will understand that the methods and techniques disclosed herein present various steps or acts in a sample order, and the present solution is not limited to the specific order or hierarchy presented unless expressly stated otherwise.

The following acronyms are used throughout the present disclosure:

| Acronym | Full Name |
| --- | --- |
| 3GPP | 3rd Generation Partnership Project |
| 5G | 5th Generation Mobile Networks |
| 5G-AN | 5G Access Network |
| 5G gNB | Next Generation NodeB |
| BFR | Beam Failure Recovery |
| BWP | Bandwidth Part |
| CCA | Clear Channel Assessment |
| DC | Dual Connectivity |
| DCI | Downlink Control Information |
| DL | Down Link or Downlink |
| DRS | Discovery Reference Signal |
| DN | Data Network |
| FR | Frequency Range |
| LBT | Listen Before Talk |
| MAC | Medium Access Control |
| MAC-CE | Medium Access Control (MAC) Control Element (CE) |
| NW | Network |
| OFDM | Orthogonal Frequency-Division Multiplexing |
| OFDMA | Orthogonal Frequency-Division Multiple Access |
| PDCCH | Physical Downlink Control Channel |
| PDCP | Packet Data Convergence Protocol |
| PDSCH | Physical Downlink Shared Channel |
| PDU | Protocol Data Unit |
| PHY | Physical Layer |
| PUCCH | Physical uplink control channel |
| QCL | Quasi-Co-Location |
| QoS | Quality of Service |
| RACH | Random Access Channel |
| RAN | Radio Access Network |
| RE | Resource Element |
| RLC | Radio Link Control |
| RS | Reference Signal |
| RSRP | Reference Signal Received Power |
| RRC | Radio Resource Control |
| SCell | Secondary Celll |
| SSB | Synchronization Signal Block |
| SpCell | Special Cell |
| SRS | Sounding Reference Signal |
| TC | Transmission Configuration |
| TCI | Transmission Configuration Indicator |
| TRS | Tracking Reference Signal |
| UE | User Equipment |
| UL | Up Link or Uplink |
| uRLLC | Ultra-Reliable Low Latency Communications |

1. Mobile Communication Technology and Environment

Figure 1:
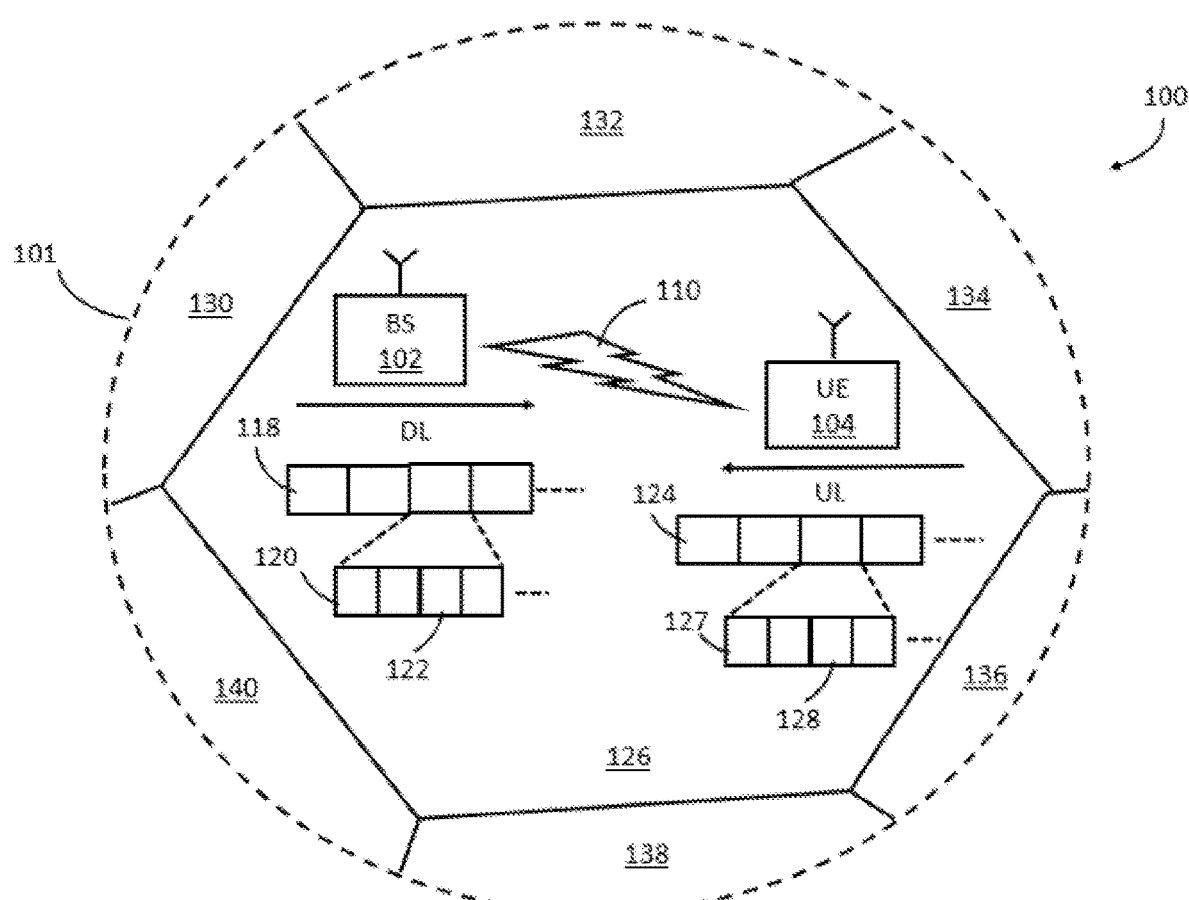
FIG. 1 illustrates an example cellular communication network in which techniques disclosed herein may be implemented, in accordance with an embodiment of the present disclosure.

FIG. 1 illustrates an example wireless communication network, and/or system, 100 in which techniques disclosed herein may be implemented, in accordance with an embodiment of the present disclosure. In the following discussion, the wireless communication network 100 may be any wireless network, such as a cellular network or a narrowband Internet of things (NB-IoT) network, and is herein referred to as "network 100." Such an example network 100 includes a base station 102 (hereinafter "BS 102"; also referred to as wireless communication node) and a user equipment device 104 (hereinafter "UE 104"; also referred to as wireless communication device) that can communicate with each other via a communication link 110 (e.g., a wireless communication channel), and a cluster of cells 126, 130, 132, 134, 136, 138 and 140 overlaying a geographical area 101. In FIG. 1, the BS 102 and UE 104 are contained within a respective geographic boundary of cell 126. Each of the other cells 130, 132, 134, 136, 138 and 140 may include at least one base station operating at its allocated bandwidth to provide adequate radio coverage to its intended users.

For example, the BS 102 may operate at an allocated channel transmission bandwidth to provide adequate coverage to the UE 104. The BS 102 and the UE 104 may communicate via a downlink radio frame 118, and an uplink radio frame 124 respectively. Each radio frame 118/124 may be further divided into sub-frames 120/127 which may include data symbols 122/128. In the present disclosure, the BS 102 and UE 104 are described herein as non-limiting examples of "communication nodes," generally, which can practice the methods disclosed herein. Such communication nodes may be capable of wireless and/or wired communications, in accordance with various embodiments of the present solution.

Figure 2:
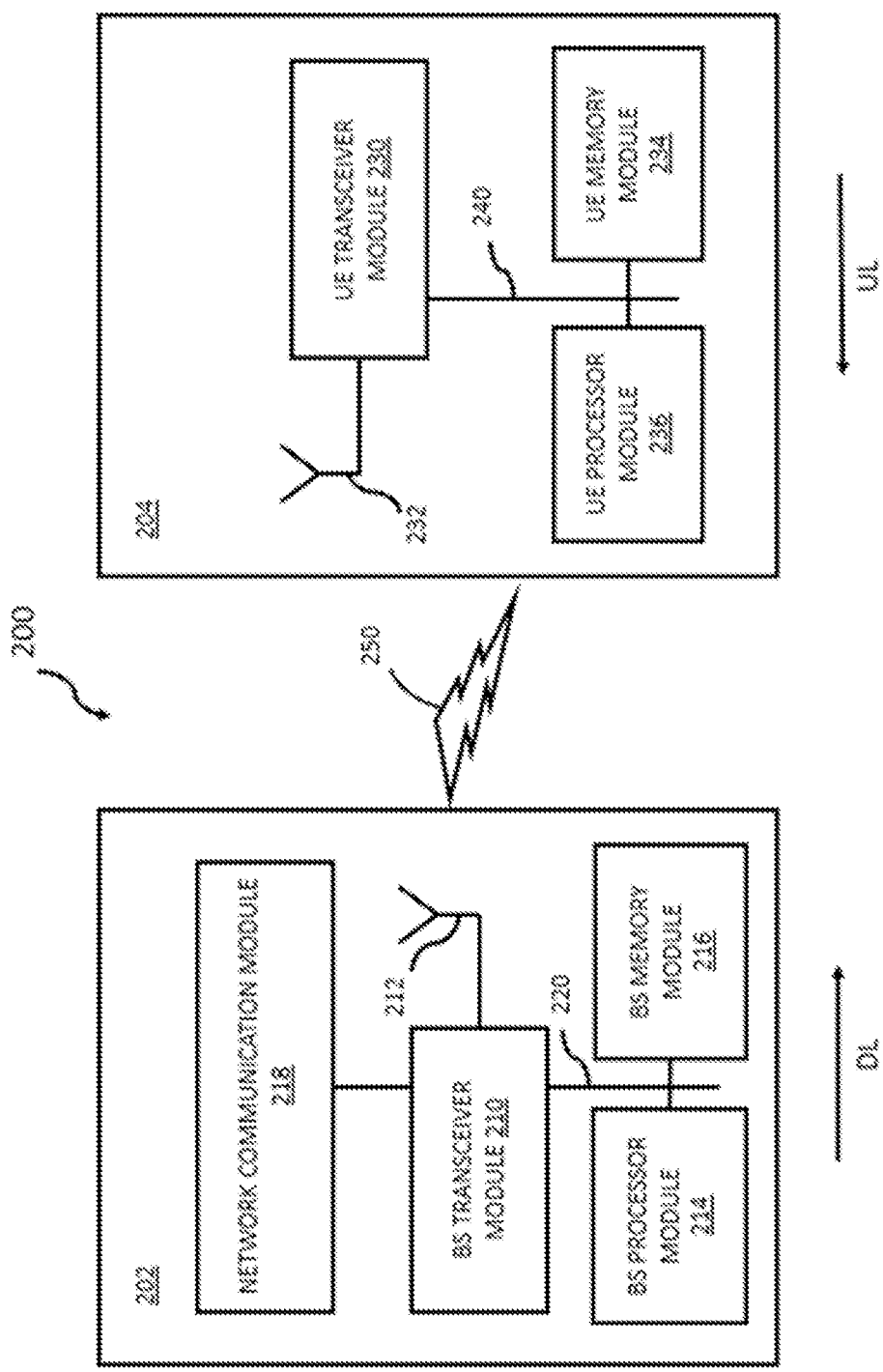
FIG. 2 illustrates a block diagram of an example base station and a user equipment device, in accordance with some embodiments of the present disclosure.

FIG. 2 illustrates a block diagram of an example wireless communication system 200 for transmitting and receiving wireless communication signals (e.g., OFDM/OFDMA signals) in accordance with some embodiments of the present solution. The system 200 may include components and elements configured to support known or conventional operating features that need not be described in detail herein. In one illustrative embodiment, system 200 can be used to communicate (e.g., transmit and receive) data symbols in a wireless communication environment such as the wireless communication environment 100 of FIG. 1, as described above.

System 200 generally includes a base station 202 (hereinafter "BS 202") and a user equipment device 204 (hereinafter "UE 204"). The BS 202 includes a BS (base station) transceiver module 210, a BS antenna 212, a BS processor module 214, a BS memory module 216, and a network communication module 218, each module being coupled and interconnected with one another as necessary via a data communication bus 220. The UE 204 includes a UE (user equipment) transceiver module 230, a UE antenna 232, a UE memory module 234, and a UE processor module 236, each module being coupled and interconnected with one another as necessary via a data communication bus 240. The BS 202 communicates with the UE 204 via a communication channel 250, which can be any wireless channel or other medium suitable for transmission of data as described herein.

As would be understood by persons of ordinary skill in the art, system 200 may further include any number of modules other than the modules shown in FIG. 2. Those skilled in the art will understand that the various illustrative blocks, modules, circuits, and processing logic described in connection with the embodiments disclosed herein may be implemented in hardware, computer-readable software, firmware, or any practical combination thereof. To clearly illustrate this interchangeability and compatibility of hardware, firmware, and software, various illustrative components, blocks, modules, circuits, and steps are described generally in terms of their functionality. Whether such functionality is implemented as hardware, firmware, or software can depend upon the particular application and design constraints imposed on the overall system. Those familiar with the concepts described herein may implement such functionality in a suitable manner for each particular application, but such implementation decisions should not be interpreted as limiting the scope of the present disclosure In accordance with some embodiments, the UE transceiver 230 may be referred to herein as an "uplink" transceiver 230 that includes a radio frequency (RF) transmitter and a RF receiver each comprising circuitry that is coupled to the antenna 232. A duplex switch (not shown) may alternatively couple the uplink transmitter or receiver to the uplink antenna in time duplex fashion. Similarly, in accordance with some embodiments, the BS transceiver 210 may be referred to herein as a "downlink" transceiver 210 that includes a RF transmitter and a RF receiver each comprising circuitry that is coupled to the antenna 212. A downlink duplex switch may alternatively couple the downlink transmitter or receiver to the downlink antenna 212 in time duplex fashion. The operations of the two transceiver modules 210 and 230 may be coordinated in time such that the uplink receiver circuitry is coupled to the uplink antenna 232 for reception of transmissions over the wireless transmission link 250 at the same time that the downlink transmitter is coupled to the downlink antenna 212. Conversely, the operations of the two transceivers 210 and 230 may be coordinated in time such that the downlink receiver is coupled to the downlink antenna 212 for reception of transmissions over the wireless transmission link 250 at the same time that the uplink transmitter is coupled to the uplink antenna 232. In some embodiments, there is close time synchronization with a minimal guard time between changes in duplex direction.

The UE transceiver 230 and the base station transceiver 210 are configured to communicate via the wireless data communication link 250, and cooperate with a suitably configured RF antenna arrangement 212/232 that can support a particular wireless communication protocol and modulation scheme. In some illustrative embodiments, the UE transceiver 210 and the base station transceiver 210 are configured to support industry standards such as the Long Term Evolution (LTE) and emerging 5G standards, and the like. It is understood, however, that the present disclosure is not necessarily limited in application to a particular standard and associated protocols. Rather, the UE transceiver 230 and the base station transceiver 210 may be configured to support alternate, or additional, wireless data communication protocols, including future standards or variations thereof.

In accordance with various embodiments, the BS 202 may be an evolved node B (eNB), a serving eNB, a target eNB, a femto station, or a pico station, for example. In some embodiments, the UE 204 may be embodied in various types of user devices such as a mobile phone, a smart phone, a personal digital assistant (PDA), tablet, laptop computer, wearable computing device, etc. The processor modules 214 and 236 may be implemented, or realized, with a general purpose processor, a content addressable memory, a digital signal processor, an application specific integrated circuit, a field programmable gate array, any suitable programmable logic device, discrete gate or transistor logic, discrete hardware components, or any combination thereof, designed to perform the functions described herein. In this manner, a processor may be realized as a microprocessor, a controller, a microcontroller, a state machine, or the like. A processor may also be implemented as a combination of computing devices, e.g., a combination of a digital signal processor and a microprocessor, a plurality of microprocessors, one or more microprocessors in conjunction with a digital signal processor core, or any other such configuration.

Furthermore, the steps of a method or algorithm described in connection with the embodiments disclosed herein may be embodied directly in hardware, in firmware, in a software module executed by processor modules 214 and 236, respectively, or in any practical combination thereof. The memory modules 216 and 234 may be realized as RAM memory, flash memory, ROM memory, EPROM memory, EEPROM memory, registers, a hard disk, a removable disk, a CD-ROM, or any other form of storage medium known in the art. In this regard, memory modules 216 and 234 may be coupled to the processor modules 210 and 230, respectively, such that the processors modules 210 and 230 can read information from, and write information to, memory modules 216 and 234, respectively. The memory modules 216 and 234 may also be integrated into their respective processor modules 210 and 230. In some embodiments, the memory modules 216 and 234 may each include a cache memory for storing temporary variables or other intermediate information during execution of instructions to be executed by processor modules 210 and 230, respectively. Memory modules 216 and 234 may also each include non-volatile memory for storing instructions to be executed by the processor modules 210 and 230, respectively.

The network communication module 218 generally represents the hardware, software, firmware, processing logic, and/or other components of the base station 202 that enable bi-directional communication between base station transceiver 210 and other network components and communication nodes configured to communication with the base station 202. For example, network communication module 218 may be configured to support internet or WiMAX traffic. In a typical deployment, without limitation, network communication module 218 provides an 802.3 Ethernet interface such that base station transceiver 210 can communicate with a conventional Ethernet based computer network. In this manner, the network communication module 218 may include a physical interface for connection to the computer network (e.g., Mobile Switching Center (MSC)). The terms "configured for," "configured to" and conjugations thereof, as used herein with respect to a specified operation or function, refer to a device, component, circuit, structure, machine, signal, etc., that is physically constructed, programmed, formatted and/or arranged to perform the specified operation or function.

The Open Systems Interconnection (OSI) Model (referred to herein as, "open system interconnection model") is a conceptual and logical layout that defines network communication used by systems (e.g., wireless communication device, wireless communication node) open to interconnection and communication with other systems. The model is broken into seven subcomponents, or layers, each of which represents a conceptual collection of services provided to the layers above and below it. The OSI Model also defines a logical network and effectively describes computer packet transfer by using different layer protocols. The OSI Model may also be referred to as the seven-layer OSI Model or the seven-layer model. In some embodiments, a first layer may be a physical layer. In some embodiments, a second layer may be a Medium Access Control (MAC) layer. In some embodiments, a third layer may be a Radio Link Control (RLC) layer. In some embodiments, a fourth layer may be a Packet Data Convergence Protocol (PDCP) layer. In some embodiments, a fifth layer may be a Radio Resource Control (RRC) layer. In some embodiments, a sixth layer may be a Non Access Stratum (NAS) layer or an Internet Protocol (IP) layer, and the seventh layer being the other layer.

2. Systems and Methods for Transmission Configuration Indicator (TCI) Switching Using Listen Before Talk (LBT) Counters In New Radio (NR), a Transmission Configuration Indicator (TCI) state may describe quasi co-location (QCL) relation for a reference signal or Synchronization Signal Block (SSB) and a control resource set/physical downlink shared channel (CORESET/PDSCH) configured in a specific cell with cell ID within a specific bandwidth part with Bandwidth part Identifier (BWP ID). An NR UE can be configured with one or more TCI state configurations on serving cell in Multi-Radio Dual Connectivity (MR-DC) or standalone NR. There can be one or more active TCI states in the active TCI states list, and the UE can perform active TCI state switching upon different triggers, such as Radio Resource Control (RRC)-based switching, Medium Access Control (MAC) Control Element (CE) based switching, Downlink Control Information (DCI)-base switching.

There are two types of requirements related to TCI states:
Active TCI state switching delay; and
Active TCI state list update.

In unlicensed spectrum, listen-before-talk (LBT) applying a clear channel assessment (CCA) check may be performed before transmitting. The CCA may utilize at least energy detection to determine the presence or absence of other signals on the channel in order to determine whether the channel is occupied or clear, respectively. If the channel is occupied, a reference signal transmission from base station may be blocked resulting in a longer time to complete the active TCI state switching procedure at the UE. In order to avoid this case, a maximum acceptable number of missed DRS (discovery reference signal) occasions for TCI requirements may be introduced at the UE. Once the number of the missed DRS occasions exceed the defined maximum, UE behavior may be defined.

For Media Access Control CE/Radio Resource Control (MAC CE/RRC) based TCI state switching procedure, the UE may receive Physical downlink control channel (PDCCH) using the new TCI state in a certain time. For the time, a maximum number for SS/PBCH blocks/Channel state information-reference signal (SSB/CSI-RS) occasions not available at the UE due to CCA failure is defined. Upon exceeding the maximum number, the UE may indicate to the lower layer to stop the active state switching procedure.

For RRC based TCI state switching, since the UE is not able to go back to the old TCI state, some recovery procedures may be considered, such as beam failure. In other words, when the number of SSB/CSI-RS occasions not available due to CCA failure exceeds a maximum value, beam failure is triggered. In the following case, for a SpCell (special cell), a random access procedure may be initialed. Via the Random Access Channel (RACH) procedure, an beam above the threshold may be informed to the network. For a SCell (secondary cell), a BFR (beam failure recovery) may be triggered. When there is available resource which accommodate the BFR MAC CE, a beam above the threshold will be informed to the network. Then, the NW (network) may indicate new TCI states based on the received beam.

For the maximum number of SSB/CSI-RS occasions not available due to CCA failure, two different states need to be distinguished (e.g., known state and unknown state). When target TCI state is known, if the target TCI state is not in the active TCI state list for PDSCH, the LBT failure number for the SSB associated with target TCI state may be counted.

When target TCI state is unknown, if TCI state switching involves (quasi-co-location) QCL-TypeD and L1-RSRP (L1 reference signal received power) measurement is based on CSI-RS, two different counters for LBT failure number of CSI-RS and SSB may be counted. When the target TCI state is unknown, if TCI state switching involves QCL-TypeD and L1-RSRP measurement is based on SSB, one counter for LBT failure number of SSB may be counted. When target TCI state is unknown, if TCI state switching involves other QCL type, the LBT failure number for SSB may be counted. Once the counter exceeds the maximum number of LBT failures, the UE may indicate to the lower layer to stop TCI state switching procedure. When receiving success indication is received, the counter may be cleared to 0 and the switching procedure may be terminated. In addition, for quasi-co-locationed (QCLed) SSB, if all transmission opportunities for one SSB in a SSB period fail to receive due to CCA failure, it may be considered as one failure for this SSB.

A. Radio Resource Control (RRC) Based Transmission Configuration Indicator (TCI) Switching I. TCI in Known State The TCI state may be identified as in the known state, when the following conditions are met (e.g., as defined in 38.133 8.10.2):

During the period from the last transmission of the RS resource used for the L1-RSRP measurement reporting for the target TCI state to the completion of active TCI state switch, where the RS resource for L1-RSRP measurement is the RS in target TCI state or QCLed to the target TCI state;

TCI state switch command is received within 1280 ms upon the last transmission of the RS resource for beam reporting or measurement;

The UE has sent at least 1 L1-RSRP report for the target TCI state before the TCI state switch command;

The TCI state remains detectable during the TCI state switching period;

The SSB associated with the TCI state remain detectable during the TCI switching period; and SNR of the TCI state ≥−3 dB In one SSB period, if LBT failure indication from the lower layer is received, LBT_COUNTER1 may be incremented by 1. LBT_COUNTER1 may be used for counting the number of LBT failures in one SSB period.

When the UE receives a PDSCH carrying RRC activation command only including one TCI state in a RRC TCI state list, if the target TCI state is known, the TCI state may not be in the active TCI state list for PDSCH. The LBT_COUNTER1 for this SSB may reach total transmission opportunities in one period, LBT_COUNTER2 may be incremented by 1. LBT_COUNTER2 may be used for counting LBT failure number of this SSB with larger granularity. Then, the LBT_COUNTER1 may be set to 0.

If the SSB periodicity is equal or shorter than 40 ms and LBT_COUNTER2 exceeds Threshold1, the UE may indicate to the lower layer to stop the active TCI state switching procedure. If the SSB periodicity is larger than 40 ms and LBT_COUNTER2 exceeds Threshold2, the UE may also indicate to the lower layer to stop the active TCI state switching procedure.

In addition, when LBT_COUNTER2 exceeds threshold 1 or threshold 2, one of these options may also be considered:

(1) The UE may trigger beam failure to recover the procedure. For SpCell, the UE will initial a random access procedure. For Sell, a beam failure recovery procedure will be triggered.

(2) the UE may switch to a specific BWP. The network may select a BWP which has lower loading. Then the BWP is configured to the UE by RRC message or indicated by MAC CE.

(3) The UE may switch to a BWP indicated by the defaultDownlinkBWP-Id if the defaultDownlinkBWP-Id is configured; Otherwise, it switches to the initialDownlinkBWP.

(4) The UE sends TCI state switching failure to the network via RRC message or MAC CE.

(5) For SpCell, the UE may indicate DL LBT failure to the upper layer. Upon receiving DL LBT failure, the RRC layer may perform Radio Link Failure (RLF). For SCell, the UE may deactivate the SCell.

(6) For SpCell, the UE may indicate DL LBT failure to the upper layer. When the UE receives a DL LBT failure and is configured Conditional Handover (CHO) configuration, the DL LBT failure may as one execution condition select a target cell to perform handover. For SCell, the UE may deactivate the SCell.

When the UE receives a success indication for the first available SSB associated with the target TCI state after RRC processing by the UE, both LBT_COUNTER1 and LBT_COUNTER2 may be set to 0. Also, the TCI state switching procedure may be successfully completed.

When the UE detects absence or receiving failure of the SSB associated with the target TCI state due to CCA failure, the UE may send a channel access failure indication to a higher layer. When the SSB associated with the target TCI state is successfully received, receiving success indication for the SSB may be sent to the higher layer.

II. TCI in Unknown State

The TCI state may be identified as in the unknown state, when at least one of the following conditions is not met (e.g., as defined in 38.133 8.10.2):

During the period from the last transmission of the RS resource used for the L1-RSRP measurement reporting for the target TCI state to the completion of active TCI state switch, where the RS resource for L1-RSRP measurement is the RS in target TCI state or QCLed to the target TCI state;

TCI state switch command is received within 1280 ms upon the last transmission of the RS resource for beam reporting or measurement;

The UE has sent at least 1 L1-RSRP report for the target TCI state before the TCI state switch command;

The TCI state remains detectable during the TCI state switching period;

The SSB associated with the TCI state remain detectable during the TCI switching period; and SNR of the TCI state ≥−3 dB The UE may receive a PDSCH carrying RRC activation command only including one TCI state in a RRC TCI state list, if the target TCI state is unknown, and may perform the following.

In one SSB period, if LBT failure indication from the lower layer is received, LBT_COUNTER1 may be incremented by 1. LBT_COUNTER1 may be used for counting LBT failure number in one SSB period. According to the configuration of target TCI state, the following three cases will be considered:

(1) TCI state switching may involve QCL-TypeD and the corresponding reference signal may be SSB;

(2) TCI state switching may involve QCL-TypeD and the corresponding reference signal may be CSI-RS; and (3) TCI state switching may involve QCL-TypeA or QCL-TypeC.

For case (1), if the target TCI state is unknown and LBT_COUNTER1 for the SSB associated with the TCI target state reaches the maximum transmission opportunities of this SSB, LBT_COUNTER2 may be incremented by 1. LBT_COUNTER2 may be used for counting LBT failure number for/of this SSB with larger granularity. Then, LBT_COUNTER1 may be set to 0

If the SSB periodicity is equal or shorter 40 ms and LBT_COUNTER2 exceeds Threshold1, the UE may indicate to the lower layer to stop the active TCI state switching procedure. If the SSB periodicity is larger than 40 ms and LBT_COUNTER2 exceeds Threshold2, the UE may also indicate to the lower layer to stop the active TCI state switching procedure.

In addition, when LBT_COUNTER2 exceeds threshold 1 or threshold 2, one of these options may also be considered:

(1) The UE may trigger beam failure to recover the procedure. For SpCell, and the UE may initial a random access procedure. For SCell, a beam failure recovery procedure may be triggered.

(2) The UE may switch to a specific BWP. The network may select a BWP which has lower loading. Then, the BWP may be configured to the UE by RRC message or indicated by MAC CE.

(3) The UE may switch to a BWP indicated by the defaultDownlinkBWP-Id if the defaultDownlinkBWP-Id is configured. Otherwise, the UE may switch to the initialDownlinkBWP.

(4) The UE may send TCI state switching failure to the network via RRC message or MAC CE.

(5) For SpCell, the UE may indicate DL LBT failure to the upper layer. Upon receiving DL LBT failure, the RRC layer may perform Radio Link Failure (RLF). For SCell, the UE may deactivate the SCell.

(6) For SpCell, the UE may indicate DL LBT failure to the upper layer. When the UE receives DL LBT failure and is configured Conditional Handover (CHO) configuration, DL LBT failure may as one execution condition select a target cell to perform handover. For SCell, the UE may deactivate the SCell.

When the UE receives a success indication for the first available SSB associated with the target TCI state after RRC processing by the UE, both LBT_COUNTER1 and LBT_COUNTER2 may be set to 0. With this, the TCI state switching procedure may be successfully completed.

For case (2) (e.g., as depicted in FIG. 3), if the target TCI state is unknown and LBT failure indication for this CSI-RS is received from the lower layer, LBT_COUNTER3 may be incremented by 1. LBT_COUNTER3 may be used for counting LBT failure number for or of a CSI-RS.

If the CSI-RS periodicity is equal or shorter than 40 ms and LBT_COUNTER3 exceeds Threshold3, the UE may indicate to the lower layer to stop the active TCI state switching procedure. If the CSI-RS periodicity is larger than 40 ms and LBT_COUNTER3 exceeds Threshold4, the UE may also indicate to the lower layer to stop the active TCI state switching procedure.

In addition, when LBT_COUNTER3 exceeds threshold 3 or threshold 4, one of these options may also be considered:

(1) The UE may trigger beam failure to recover the procedure. For SpCell, the UE may initial a random access procedure. For SCell, a beam failure recovery procedure may be triggered;

(2) The UE may switch to a specific BWP. The network may select a BWP which has lower loading. Then, the BWP may be configured to the UE by RRC message or indicated by MAC CE.

(3) The UE may switch to a BWP indicated by the defaultDownlinkBWP-Id if the defaultDownlinkBWP-Id is configured. Otherwise, the UE may switch to the initialDownlinkBWP.

(4) The UE may send TCI state switching failure to the network via RRC message or MAC CE.

(5) For SpCell, the UE may indicate DL LBT failure to the upper layer. Upon receiving DL LBT failure, the RRC layer may perform Radio Link Failure (RLF). For SCell, the UE may deactivate the SCell.

(6) For SpCell, the UE may indicate DL LBT failure to the upper layer. When the UE receives DL LBT failure and is configured Conditional Handover (CHO) configuration, DL LBT failure may as one execution condition select a target cell to perform handover. For SCell, the UE may deactivate the SCell.

When the UE receives a success indication for the first available CSI-RS after RRC processing by the UE, the UE may set LBT_COUNTER3 to 0 and consider CSI-RS to be successfully received.

In the following, if LBT_COUNTER1 for the SSB associated with target TCI state reaches the maximum transmission opportunities of this SSB in one period, LBT_COUNTER4 may be incremented by 1. LBT_COUNTER4 may be used for counting LBT failure number for or of SSB with larger granularity. Then, LBT_COUNTER1 may be set to 0.

If the SSB periodicity is equal or shorter than 40 ms and LBT_COUNTER4 exceeds Threshold5, the UE may indicate to the lower layer to stop the active TCI state switching procedure. If the SSB periodicity is larger than 40 ms and LBT_COUNTER4 exceeds Threshold6, the UE may also indicate to the lower layer to stop the active TCI state switching procedure.

In addition, when LBT_COUNTER4 exceeds threshold 5 or threshold 6, one of these options may also be considered:

(1) The UE may trigger beam failure to recover the procedure. For SpCell, the UE will initial a random access procedure. For SCell, a beam failure recovery procedure may be triggered.

(2) The UE may switch to a specific BWP. The network may select a BWP which has lower loading. Then, the BWP may be configured to the UE by RRC message or indicated by MAC CE.

(3) The UE may switch to a BWP indicated by the defaultDownlinkBWP-Id if the defaultDownlinkBWP-Id is configured. Otherwise, the UE may switch to the initialDownlinkBWP.

(4) The UE may send TCI state switching failure to the network via RRC message or MAC CE.

(5) For SpCell, the UE may indicate DL LBT failure to the upper layer. Upon receiving DL LBT failure, the RRC layer may perform Radio Link Failure (RLF). For SCell, the UE may deactivate the SCell.

(6) For SpCell, the UE may indicate DL LBT failure to the upper layer. When the UE receives DL LBT failure and is configured Conditional Handover (CHO) configuration, the DL LBT failure may as one execution condition select a target cell to perform handover. For SCell, the UE may deactivate the SCell.

When the UE receives a success indication for the first available SSB after L1-RSRP measurement, both LBT_COUNTER1 and LBT_COUNTER4 may be set to 0.

For case (3), if LBT_COUNTER1 for the SSB associated with target TCI state and reaches the maximum transmission opportunities of this SSB, LBT_COUNTER5 may be incremented by 1. LBT_COUNTER5 may be used for counting LBT failure number for/of SSB with larger granularity. Then, LBT_COUNTER1 may be set to 0.

If the SSB periodicity is equal or shorter than 40 ms and LBT_COUNTER5 exceeds Threshold7, the UE may indicate the lower layer to stop the active TCI state switching procedure. If the SSB periodicity is larger than 40 ms and LBT_COUNTER5 exceeds Threshold8, the UE may also indicate the lower layer to stop the active TCI state switching procedure.

In addition, when LBT_COUNTER5 exceeds threshold 7 or threshold 8, one of these options may also be considered:
(1) The UE may trigger beam failure to recover the procedure. For SpCell, the UE may initiate a random access procedure. For SCell, a beam failure recovery procedure may be triggered.
(2) The UE may switch to a specific BWP. The network may select a BWP which has lower loading. Then, the BWP may be configured to the UE by RRC message or indicated by MAC CE.
(3) The UE may switch to a BWP indicated by the defaultDownlinkBWP-Id if the defaultDownlinkBWP-Id is configured. Otherwise, the UE may switch to the initialDownlinkBWP.
(4) The UE may send TCI state switching failure to the network via RRC message or MAC CE.
(5) For SpCell, the UE may indicate DL LBT failure to the upper layer. Upon receiving DL LBT failure, the RRC layer may perform Radio Link Failure (RLF). For SCell, the UE may deactivate the SCell.
(6) For SpCell, the UE may indicate DL LBT failure to the upper layer. When the UE receives DL LBT failure and is configured Conditional Handover (CHO) configuration, the DL LBT failure may as one execution condition select a target cell to perform handover. For SCell, the UE may deactivate the SCell.

When the UE receives a success indication for the first available SSB after RRC processing by the UE, both LBT_COUNTER1 and LBT_COUNTER5 may be set to 0. With this, the TCI state switching procedure may be successfully completed.

When the UE detects absence or receives failure of the SSB associated with the target TCI state due to CCA failure, the UE may send a channel access failure indication to a higher layer. When the SSB associated with the target TCI state is successfully received, a receiving success indication for the SSB may be sent to the higher layer.

B. Media Access Control (MAC) Control Element (CE) Based Transmission Configuration Indicator (TCI) Switching I. TCI in Known State The TCI state may be identified as in the known state, when the following conditions are met (e.g., as defined in 38.133 8.10.2):
During the period from the last transmission of the RS resource used for the L1-RSRP measurement reporting for the target TCI state to the completion of active TCI state switch, where the RS resource for L1-RSRP measurement is the RS in target TCI state or QCLed to the target TCI state;
TCI state switch command is received within 1280 ms upon the last transmission of the RS resource for beam reporting or measurement;
The UE has sent at least 1 L1-RSRP report for the target TCI state before the TCI state switch command;
The TCI state remains detectable during the TCI state switching period;
The SSB associated with the TCI state remain detectable during the TCI switching period; and
SNR of the TCI state ≥−3 dB In one SSB period, if LBT failure indication from the lower layer is received, LBT_COUNTER1 may be incremented by 1. LBT_COUNTER1 may be used for counting LBT failure number in one SSB period.

When the UE receives PDSCH carrying MAC-CE activation command, if the target TCI state is known, it may not be in the active TCI state list for PDSCH, and LBT_COUNTER1 for this SSB reaches total transmission opportunities of this SSB in one period, LBT_COUNTER2 may be incremented by 1. LBT_COUNTER2 may be used for counting LBT failure number of this SSB with large granularity. Then, LBT_COUNTER1 may be set to 0.

If the SSB periodicity is equal or shorter than 40 ms and LBT_COUNTER2 exceeds Threshold1, the UE may indicate the lower layer to abandon or stop the active TCI state switching procedure and stay in old state. When the SSB periodicity is larger than 40 ms and LBT_COUNTER2 exceeds Threshold2, the UE may also indicate the lower layer to stop the active TCI state switching procedure and stay in old state.

In addition, when LBT_COUNTER2 exceeds threshold 1 or threshold 2, one of these options may also be considered:
(1) The UE may trigger beam failure to recover the procedure. For SpCell, the UE may initiate a random access procedure. For SCell, a beam failure recovery procedure may be triggered.
(2) The UE may switch to a specific BWP. The network may select a BWP which has lower loading. Then, the BWP may be configured to the UE by RRC message or indicated by MAC CE.
(3) The UE may switch to a BWP indicated by the defaultDownlinkBWP-Id if the defaultDownlinkBWP-Id is configured. Otherwise, the UE may switch to the initialDownlinkBWP.
(4) The UE may send TCI state switching failure to the network via RRC message or MAC CE.
(5) For SpCell, the UE may indicate DL LBT failure to the upper layer. Upon receiving DL LBT failure, the RRC layer performs Radio Link Failure (RLF). For SCell, the UE may deactivate the SCell.
(6) For SpCell, the UE may indicate DL LBT failure to the upper layer. When the UE receives DL LBT failure and is configured Conditional Handover (CHO) configuration, DL LBT failure may as one execution condition select a target cell to perform handover. For SCell, the UE may deactivate the SCell.

When the UE receives a success indication for the first available SSB associated with the target TCI state after MAC CE command is decoded by the UE, both LBT_COUNTER1 and LBT_COUNTER2 may be set to 0. With this, the TCI state switching procedure may be successfully completed.

When the UE detects absence or receives failure of the SSB associated with the target TCI state due to CCA failure, the UE may send a channel access failure indication to the high layer. When the SSB associated with the target TCI state is successfully received, a receiving success indication for the SSB may be sent to the high layer.

II. TCI in Unknown State

The TCI state may be identified as in the unknown state, when at least one of the following conditions is not met (e.g., as defined in 38.133 8.10.2):
During the period from the last transmission of the RS resource used for the L1-RSRP measurement reporting for the target TCI state to the completion of active TCI state switch, where the RS resource for L1-RSRP measurement is the RS in target TCI state or QCLed to the target TCI state;

TCI state switch command is received within 1280 ms upon the last transmission of the RS resource for beam reporting or measurement;

The UE has sent at least 1 L1-RSRP report for the target TCI state before the TCI state switch command;

The TCI state remains detectable during the TCI state switching period;

The SSB associated with the TCI state remain detectable during the TCI switching period; and SNR of the TCI state ≥−3 dB When the UE receives PDSCH carrying MAC-CE activation command, if the target TCI state is unknown, the following may be carried out.

In one SSB period, if LBT failure indication from the lower layer is received, LBT_COUNTER1 is incremented by 1. LBT_COUNTER1 is used for counting LBT failure number in one SSB period. According to the configuration of target TCI state, the following three cases will be considered:

(1) TCI state switching may involve QCL-TypeD and the corresponding reference signal may be SSB;
(2) TCI state switching may involve QCL-TypeD and the corresponding reference signal may be CSI-RS;
(3) TCI state switching may involve QCL-TypeA or QCL-TypeC.

For case (1), if the target TCI state is unknown and LBT_COUNTER1 for the SSB associated with the TCI target state reaches the maximum transmission opportunities of this SSB, LBT_COUNTER2 may be incremented by 1. LBT_COUNTER2 may be used for counting LBT failure number for or of this SSB with larger granularity. Then, LBT_COUNTER1 may be set to 0.

If the SSB periodicity is equal or shorter 40 ms and LBT_COUNTER2 exceeds Threshold1, the UE may indicate the lower layer to stop the active TCI state switching procedure and stay in old state. If the SSB periodicity is larger than 40 ms and LBT_COUNTER2 exceeds Threshold2, the UE may also indicate the lower layer to stop the active TCI state switching procedure and stay in old state.

In addition, when LBT_COUNTER2 exceeds threshold 1 or threshold 2, one of these options may also be considered:

(1) The UE may trigger beam failure to recover the procedure. For SpCell, the UE may initiate a random access procedure. For SCell, a beam failure recovery procedure may be triggered.
(2) The UE may switch to a specific BWP. The network may select a BWP which has lower loading. Then, the BWP may be configured to the UE by RRC message or indicated by MAC CE.
(3) The UE may switch to a BWP indicated by the defaultDownlinkBWP-Id if the defaultDownlinkBWP-Id is configured; Otherwise, it switches to the initialDownlinkBWP.
(4) The UE may send TCI state switching failure to the network via RRC message or MAC CE.
(5) For SpCell, the UE may indicate DL LBT failure to the upper layer. Upon receiving DL LBT failure, the RRC layer may perform Radio Link Failure (RLF). For SCell, the UE may deactivate the SCell.
(6) For SpCell, the UE may indicate DL LBT failure to the upper layer. When the UE receives DL LBT failure and is configured Conditional Handover (CHO) configuration, DL LBT failure may as one execution condition select a target cell to perform handover. For SCell, the UE may deactivate the SCell.

When the UE receives a success indication for the first available SSB associated with the target TCI state after MAC CE command is decoded by the UE, both LBT_COUNTER1 and LBT_COUNTER2 may be set to 0. With this, the TCI state switching procedure is successfully completed For case (2), (e.g., as depicted in FIG. 4), if the target TCI state is unknown and LBT failure indication for this CSI-RS is received from the lower layer, LBT_COUNTER3 may be incremented by 1. LBT_COUNTER3 may be used for counting LBT failure number for/of CSI-RS.

If the CSI-RS periodicity is equal or shorter than 40 ms and LBT_COUNTER3 exceeds Threshold3, the UE may indicate the lower layer to stop the active TCI state switching procedure. If the CSI-RS periodicity is larger than 40 ms and LBT_COUNTER3 exceeds Threshold4, the UE may also indicate to the lower layer to stop the active TCI state switching procedure and stay in old state.

When the UE receives a success indication for the first available CSI-RS after MAC CE command is decoded by the UE, the UE may set LBT_COUNTER3 to 0 and consider CSI-RS to be successfully received.

In the following, if LBT_COUNTER1 for the SSB associated with target TCI state reaches the maximum transmission opportunities of this SSB in one period, LBT_COUNTER4 may be incremented by 1. LBT_COUNTER4 may be used for counting LBT failure number for/of SSB with larger granularity. Then, LBT_COUNTER1 may be set to 0.

If the SSB periodicity is equal or shorter than 40 ms and LBT_COUNTER4 exceeds Threshold5, the UE may indicate to the lower layer to stop the active TCI state switching procedure and stay in old state. If the SSB periodicity is larger than 40 ms and LBT_COUNTER4 exceeds Threshold6, the UE may also indicate to the lower layer to stop the active TCI state switching procedure and stay in old state.

In addition, when LBT_COUNTER2 exceeds threshold 5 or threshold 6, one of these options may also be considered:

(1) The UE may trigger beam failure to recover the procedure. For SpCell, the UE may initiate a random access procedure. For SCell, a beam failure recovery procedure may be triggered.
(2) The UE may switch to a specific BWP. The network may select a BWP which has lower loading. Then, the BWP may be configured to the UE by RRC message or indicated by MAC CE.
(3) The UE may switch to a BWP indicated by the defaultDownlinkBWP-Id if the defaultDownlinkBWP-Id is configured. Otherwise, the UE may switch to the initialDownlinkBWP.
(4) The UE may send TCI state switching failure to the network via RRC message or MAC CE.
(5) For SpCell, the UE may indicate DL LBT failure to the upper layer. Upon receiving DL LBT failure, the RRC layer performs Radio Link Failure (RLF). For SCell, the UE may deactivate the SCell.
(6) For SpCell, the UE may indicate DL LBT failure to the upper layer. When the UE receives DL LBT failure and is configured Conditional Handover (CHO) configuration, the DL LBT failure may as one execution condition to select a target cell to perform handover. For SCell, the UE may deactivate the SCell.

When the UE receives a success indication for the first available SSB after L1-RSRP measurement, both LBT_COUNTER1 and LBT_COUNTER4 may be set to 0.

For case (3), if LBT_COUNTER1 for the SSB associated with target TCI state reaches the maximum transmission opportunities of this SSB, LBT_COUNTER5 may be incremented by 1. LBT_COUNTER5 may be used for counting LBT failure number of SSB with larger granularity. Then, LBT_COUNTER1 may beset to 0.

If the SSB periodicity is equal or shorter than 40 ms and LBT_COUNTER5 exceeds Threshold7, the UE may indicate the lower layer to stop the active TCI state switching procedure and stay in old state. If the SSB periodicity is larger than 40 ms and LBT_COUNTER5 exceeds Threshold8, the UE may also indicate the lower layer to stop the active TCI state switching procedure and stay in old state.

In addition, when LBT_COUNTER2 exceeds threshold 7 or threshold 8, one of these options may also be considered:
(1) The UE may trigger beam failure to recover the procedure. For SpCell, the UE may initiate a random access procedure. For SCell, a beam failure recovery procedure may be triggered.
(2) The UE may switch to a specific BWP. The network may select a BWP which has lower loading. Then, the BWP may be configured to the UE by RRC message or indicated by MAC CE.
(3) The UE may switch to a BWP indicated by the defaultDownlinkBWP-Id if the defaultDownlinkBWP-Id is configured. Otherwise, the UE may switch to the initialDownlinkBWP.
(4) The UE may send TCI state switching failure to the network via RRC message or MAC CE.
(5) For SpCell, the UE may indicate DL LBT failure to the upper layer. Upon receiving DL LBT failure, the RRC layer performs Radio Link Failure (RLF). For SCell, the UE may deactivate the SCell.
(6) For SpCell, the UE may indicate DL LBT failure to the upper layer. When the UE receives DL LBT failure and is configured Conditional Handover (CHO) configuration, DL LBT failure may as one execution condition to select a target cell to perform handover. For SCell, the UE may deactivate the SCell.

When the UE receives a success indication for the first available SSB after MAC CE command is decoded by the UE, both LBT_COUNTER1 and LBT_COUNTER5 may be set to 0.

When the UE detects absence or receives failure of the SSB associated with the target TCI state due to CCA failure, the UE may send a channel access failure indication to high layer. When the SSB associated with the target TCI state is successfully received, a receiving success indication for the SSB may be sent to the high layer.

C. Transmission Configuration Indicator (TCI) Using Timers

When the TCI state switching procedure is successfully completed (e.g., the RRC-based or MAC-CE based TCI switching in either known or unknown state), if PDCCH is not received, LBT failure statistics may not be terminated for a long time. And since TCI state switching has been completed, the statistics may not be meaningful. Hence a timer may be introduced to avoid this case. In the following, two cases are distinguished:
(1) when TCI state is unknown, TCI state switching involves QCL-TypeD, and the corresponding reference signal is CSI-RS, may be two different statistics (e.g., the two different counters) may be used.
(2) for other cases, only one statistic may be needed.

For case (1) and case (2), two different timers may be introduced. When the UE receives RRC based or MAC CE based TCI state switching, according to the different cases, the corresponding timer may be started. Once the maximum number of LBT failure exceeds a threshold within the timer, the UE may indicate the lower layer to stop TCI state switching. If the timer expires, the counter used for counting LBT failure may be cleared to 0 and consider TCI state switching procedure successfully completed.

For case (1), when CSI-RS is successfully received, a success indication may be needed to inform higher layer. Then the counter for CSI-RS may be cleared to 0. The UE may proceed to count LBT failure number for SSB. For case (2), since timer is used, a success indication may not be needed.

D. Transmission Configuration Indicator (TCI) Using Indicators

When the UE receives RRC based or MAC CE based TCI state switching, the UE may indicate the lower layer to report the LBT outcome for the target TCI state and the outcome of SSB/CSI-RS successful receiving. Once the UE receives a success indication (e.g., a SSB or CSI-RS successful in TCI switching procedure), the UE may indicate the lower layer to stop reporting. If the counter for LBT failure number of SSB/CSI-RS exceeds a threshold, the UE may indicate the lower layer to stop TCI state switching procedure.

If the UE receives a start reporting indication, the UE may send the LBT outcome for the target TCI state and the outcome of SSB/CSI-RS successful receiving to higher layer. Once the UE receives a stop TCI state switching indication, the UE may stop to send. In addition, if the UE receives stopping reporting indication, the UE also will stop to send.

E. Transmission Configuration Indicator (TCI) Using Timers and MAC Layer

The TCI state may be identified as in the known state, when the following conditions are met (e.g., as defined in 38.133 8.10.2):
During the period from the last transmission of the RS resource used for the L1-RSRP measurement reporting for the target TCI state to the completion of active TCI state switch, where the RS resource for L1-RSRP measurement is the RS in target TCI state or QCLed to the target TCI state;
TCI state switch command is received within 1280 ms upon the last transmission of the RS resource for beam reporting or measurement;
The UE has sent at least 1 L1-RSRP report for the target TCI state before the TCI state switch command;
The TCI state remains detectable during the TCI state switching period;
The SSB associated with the TCI state remain detectable during the TCI switching period; and
SNR of the TCI state ≥−3 dB When the UE receives a PDSCH carrying RRC activation command only including one TCI state in a RRC TCI state list and the target TCI state is not in the active TCI state list for PDSCH, the timer may be started.

In one SSB period, if LBT failure indication from the lower layer is received, LBT_COUNTER1 may be incremented by 1. LBT_COUNTER1 may be used for counting the number of LBT failures in one SSB period.

When LBT_COUNTER1 for this SSB reaches total transmission opportunities in one period, LBT_COUNTER2 may be incremented by 1. LBT_COUNTER2 may be used for counting LBT failure number of this SSB with more granularity. Then, LBT_COUNTER1 may be to 0.

If the SSB periodicity is equal or shorter than 40 ms and LBT_COUNTER2 exceeds Threshold1, the timer may be stopped and the UE may indicate to the lower layer to stop the active TCI state switching procedure. If the SSB periodicity is larger than 40 ms and LBT_COUNTER2 exceeds Threshold2, the timer may be stopped and the UE also may indicate to the lower layer to stop the active TCI state switching procedure.

In addition, when LBT_COUNTER2 exceeds threshold 1 or threshold 2, one of these options may also be considered:
(1) The UE may trigger beam failure to recover the procedure. For SpCell, the UE may initiate a random access procedure. For SCell, a beam failure recovery procedure may be triggered.
(2) The UE may switch to a specific BWP. The network may select a BWP which has lower loading. Then, the BWP may be configured to the UE by RRC message or indicated by MAC CE.
(3) The UE may switch to a BWP indicated by the defaultDownlinkBWP-Id if the defaultDownlinkBWP-Id is configured. Otherwise, the UE may switch to the initialDownlinkBWP.
(4) The UE may send TCI state switching failure to the network via RRC message or MAC CE.
(5) For SpCell, the UE may indicate DL LBT failure to the upper layer. Upon receiving DL LBT failure, the RRC layer performs Radio Link Failure (RLF). For SCell, the UE may deactivate SCell.
(6) For SpCell, the UE may indicate DL LBT failure to the upper layer. When the UE receives DL LBT failure and is configured Conditional Handover (CHO) configuration, the DL LBT failure may as one execution condition to select a target cell to perform handover. For SCell, the UE may deactivate the SCell.

When the timer expires, both LBT_COUNTER1 and LBT_COUNTER2 may be set to 0. With this, the TCI state switching procedure may be successfully completed. When the UE detects absence or receive failure of the SSB associated with the target TCI state due to CCA failure, the UE may send a channel access failure indication to a higher layer.

Figure 5:
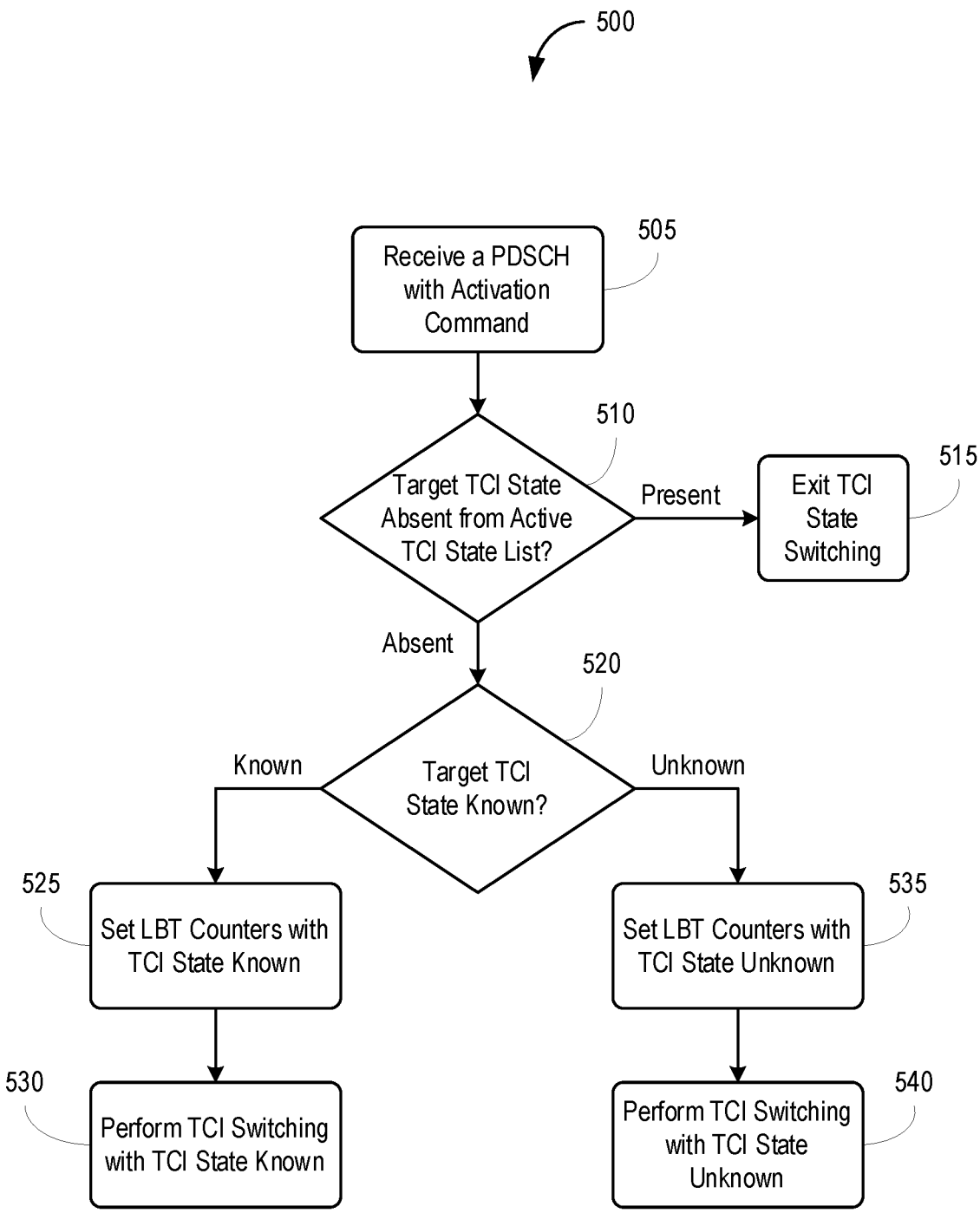
FIG. 5 illustrates a flow diagram of transmission configuration indicator (TCI) switching using listing before talk (LBT) counters.

F. Process for Transmission Configuration Indicator (TCI) Switching Using Listen Before Talk (LBT) Counters Referring to FIG. 5, depicted is a flow diagram of a process or method 500 for TCI switching using LBT counters. The method 500 may be implemented or performed by any of the components detailed herein, such as a BS 102, UE 104, and cells 126, 130, 132, 134, 136, 138 and 140, among others. In brief overview, a wireless communication device (e.g., UE 104) may receive a physical data shared channel (PDSCH) with an activation command (505). The wireless communication device may determine whether a target TCI state is absent from an active TCI state list (510). If the target TCI state is determined to be present, the wireless communication device may exit TCI state switching (515). If the target TCI state is determined to be absent, the wireless communication device may determine whether the target TCI state is known (520). When the target TCI state is known, the wireless communication device may set LBT counters with TCI state known (525). The wireless communication device may perform the TCI switching procedure with the TCI state known (530). Conversely, when the target TCI state is unknown, the wireless communication device may set the LBT counters with TCI state unknown (535). The wireless communication device may perform the TCI switching procedure with the TCI state unknown (540).

In further detail, a wireless communication device (e.g., UE 104) may retrieve, identify, or receive a physical data shared channel (PDSCH) with an activation command (505). The wireless communication device may be in an active TCI switching procedure. The TCI state may define a QCL relation for a reference signal or a synchronization signal block (SSB) and a control resource set (CORESET) or physical downlink shared channel (PDSCH) for a specific cell within a bandwidth path. Under the active TCI switching procedure, the wireless communication device may select an active bandwidth part (BWP) in accordance with a target TCI state. The wireless communication device may retrieve, identify, or receive a PDSCH with the activation command. In some embodiments, the activation command may identify, correspond to, or include a radio resource control (RRC) activation command. The RRC activation command may identify, define, or include at least one TCI state in an active TCI state list. In some embodiments, the activation command may identify, correspond to, or include a medium access control, control element (MAC-CE) activation command.

The wireless communication device may identify or determine whether a target TCI state is absent from an active TCI state list (510). In some embodiments, the wireless communication device may parse the active TCI state list to search for, identify, or determine whether the target TCI state. When no target TCI state is found in the active TCI state list, the wireless communication device may identify or determine that the target TCI state is present in the active TCI state list. If the target TCI state is determined to be present, the wireless communication device may exit TCI state switching procedure (515). On the other hand, when the target TCI is found in the active TCI state list, the wireless communication device may identify or determine that the TCI state is absent from the active TCI state list.

If the target TCI state is determined to be absent, the wireless communication device may identify or determine whether the target TCI state is known (520). The TCI state switching procedure may depend on whether the target TCI is known or unknown. The determination may be based on, for example, the following conditions:

During the period from the last transmission of the RS resource used for the L1-RSRP measurement reporting for the target TCI state to the completion of active TCI state switch, where the RS resource for L1-RSRP measurement is the RS in target TCI state or QCLed to the target TCI state;

TCI state switch command is received within 1280 ms upon the last transmission of the RS resource for beam reporting or measurement;

The UE has sent at least 1 L1-RSRP report for the target TCI state before the TCI state switch command;

The TCI state remains detectable during the TCI state switching period;

The SSB associated with the TCI state remain detectable during the TCI switching period; and SNR of the TCI state ≥−3 dB When all the conditions are satisfied, the wireless communication device may identify or determine that the TCI state is known. In contrast, when at least one of the conditions is not satisfied, the wireless communication device may identify or determine that the TCI state is unknown.

When the target TCI state is known, the wireless communication device may configure, modify, or otherwise set LBT counters (e.g., LBT_COUNTER1, LBT_COUNTER2, etc.) with TCI state known (525). The LBT counters may be used to track or count the number of LBT failures in one SSB period or during CSI-RS based L1-RSRP measurement. In some embodiments, the wireless communication device may identify or determine whether a first counter (e.g., LBT_COUNTER1) has reached a defined limit. The first counter may be used to count the number of LBT failures in a SSB period. The defined limit may correspond to total number of transmission opportunities during the SSB period, and a a value of the first counter at which update or increment a second counter (e.g., LBT_COUNTER2). When the first counter is determined to have not reached the defined limit, the wireless communication device may maintain the second counter. Otherwise, when the first counter is determined to have reached the defined limit, the wireless communication device may update or increment the second counter. The second counter may also be used to count the number of LBT failures in the SSB period with a different granularity compared to the first counter. With the incrementing of the second counter, the wireless communication device may set the first counter to zero.

The wireless communication device may perform the TCI switching procedure with the TCI state known (530). In performing the TCI switching procedure, the wireless communication device may compare the one or more counters (e.g., LBT_COUNTER1, LBT_COUNTER2, etc.) to one or more thresholds (e.g., Threshold1 and Threshold2). In some embodiments, the comparison of the counters to the thresholds may be in relation to an SSB period. In some embodiments, the wireless communication device may determine, identify, or receive a success indicator for an available SSB associated with the target TCI state. The success indicator may correspond to a successful completion of the TCI switching procedure, and may be received when both counters are within the defined thresholds. In some embodiments, upon receipt of the success indicator, the wireless communication device may set the first counter and the second counter to a predefined value (e.g., zero or null).

In some embodiments, the wireless communication device may convey or indicate to a lower layer (e.g., the physical layer) to stop the active TCI state switching procedure based on the comparison. When the SSB period is less than or equal to a defined time duration and the second counter exceeds a first threshold (e.g., Threshold1), the wireless communication device may indicate to the lower layer to stop the active TCI state switching procedure. The first threshold may define the value for the second counter at which to stop the active TCI state switching procedure when the SSB period is less than or equal to the defined time duration (E.g., 30-50 ms). When the SSB period is more than the defined time duration and the second counter exceeds a second threshold (e.g., Threshold2), the wireless communication device may also indicate to the lower layer to stop the active TCI state switching procedure. The second threshold may define the value for the second counter at which to stop the active TCI state switching procedure when the SSB period is more than the defined time duration. Otherwise, the wireless communication device may refrain from indicating to the lower layer to stop the activate TCI switching procedure, and continue the process.

In some embodiments, the wireless communication device may convey or indicate a TCI state switching failure based on the comparison of the counters to the threshold. When the second counter exceeds the first threshold or the second threshold, the wireless communication device may cause or trigger a beam failure to resume the TCI state switching procedure. The beam failure recovery may be to triggered to find a new resource. In some embodiments, the wireless communication device may change, or otherwise switch over to at least one other downlink (DL) bandwidth part (BWP) configured by the network when the second counter exceeds either threshold. In some embodiments, the wireless communication device may change or otherwise switch over to a specified BWP when the second counter exceeds either threshold. The BWP specified by a BWP identifier (e.g., defaultDownlinkBWP-Id or initialDownlinkBWP). In some embodiments, the wireless communication device may indicate a TCI state switching failure to the network via a RRC or MAC-CE message. The TCI state switching failure may indicate a failure to complete the TCI state switching procedure. In some embodiments, the wireless communication device may indicate a DL LBT failure to an upper layer (e.g., an RRC or MAC layer) to perform a radio link failure (RLF) for a SpCell or to deactivate a SCell for the SCell. In some embodiments, the wireless communication device may indicate a DL LBT failure to an upper layer (e.g., an RRC or MAC layer). Upon receipt of the DL LBT failure and configuration with conditional handover (CHO) configuration, the wireless communication device may select a target cell to perform the handover for SpCell or to deactivate a SCell for the SCell.

Conversely, when the target TCI state is unknown, the wireless communication device may set the LBT counters with TCI state unknown (535). The LBT counters may be used to track or count the number of LBT failures in one SSB period or during CSI-RS based L1-RSRP measurement. In some embodiments, the wireless communication device may update or otherwise increment a first counter (e.g., LBT_COUNTER1) in response to receiving a LBT failure indication from a lower layer (e.g., physical layer). The first counter may be used to count a number of LBT failures in a SSB period. In some embodiments, when the active TCI state switching procedure is associated with a QCL Type D, the wireless communication device may update or increment a third counter (e.g., LBT_COUNTER3) in response to receiving the LBT failure indicator from the lower layer. The third counter may be used to count a number of LBT failures in a CSI-RS transmission.

In some embodiments, when the active TCI state switching procedure is associated with a quasi-co-location (QCL) Type D, the wireless communication device may identify or determine whether a first counter has reached a defined limit. The first counter may be used to count the number of LBT failures in the SSB period. The defined limit may correspond to total number of transmission opportunities during the SSB period, and a value of the first counter at which update or increment a second counter (e.g., LBT_COUNTER2). When the first counter is determined to have not reached the defined limit, the wireless communication device may maintain the second counter. Otherwise, when the first counter is determined to have reached the defined limit, the wireless communication device may update or increment the second counter. The second counter may also be used to count the number of LBT failures in the SSB period with a different granularity compared to the first counter. With the incrementing of the second counter, the wireless communication device may set the first counter to zero.

The wireless communication device may perform the TCI switching procedure with the TCI state unknown (540). In performing the TCI switching procedure, the wireless communication device may compare the one or more counters (e.g., LBT_COUNTER1, LBT_COUNTER2, etc.) to one or more thresholds (e.g., Threshold1 and Threshold2). In some embodiments, the comparison of the counters to the thresholds may be in relation to an SSB period. In some embodiments, the wireless communication device may determine, identify, or receive a success indicator for an available SSB associated with the target TCI state. The success indicator may correspond to a successful completion of the TCI switching procedure, and may be received when both the first and second counters are within the defined thresholds. In some embodiments, the wireless communication device may set the first counter and the second counter to a predefined value (e.g., zero or null) in response to receiving the success indicator. In some embodiments, the wireless communication device may determine, identify, or receive a success indicator for a success indicator for an available CSI-RS associated with the target TCI state. The success indicator may correspond to a successful completion of the TCI switching procedure, and may be received when the third counter is within the defined threshold. In some embodiments, the wireless communication device may set the third counter to a predefined value (e.g., zero or null) in response to receiving the success indicator.

In some embodiments, the wireless communication device may convey or indicate to a lower layer (e.g., the physical layer) based on the comparison. When the SSB period is less than or equal to a defined time duration and the second counter exceeds a first threshold (e.g., Threshold1), the wireless communication device may indicate to the lower layer to stop the active TCI state switching procedure. The first threshold may define the value for the second counter at which to stop the active TCI state switching procedure when the SSB period is less than or equal to the defined time duration (e.g., 30-50 ms). When the SSB period is more than the defined time duration and the second counter exceeds a second threshold (e.g., Threshold2), the wireless communication may also indicate to the lower layer to stop the active TCI state switching procedure. The second threshold may define the value for the second counter at which to stop the active TCI state switching procedure when the SSB period is more than the defined time duration. Otherwise, the wireless communication device may refrain from indicating to the lower layer to stop the activate TCI switching procedure, and continue the process.

In some embodiments, when the CSI-RS transmission period is less than or equal to a defined time duration and the third counter exceeds a third threshold (e.g., Threshold3), the wireless communication device may indicate to the lower layer to stop the activate TCI state switching procedure. The third threshold may define the value for the third counter at which to stop the active TCI state switching procedure when the CSI-RS transmission period is less than or equal to the defined time duration (e.g., 30-50 ms). When the CSI-RS transmission period is more than the defined time duration and the third counter exceeds a fourth threshold (e.g., Threshold4), the wireless communication device may indicate to the lower layer to stop the activate TCI state switching procedure. The fourth threshold may define the value for the third counter at which to stop the active TCI state switching procedure when the CSI-RS transmission period is less than or equal to the defined time duration (e.g., 30-50 ms). Otherwise, the wireless communication device may refrain from indicating to the lower layer to stop the activate TCI switching procedure, and continue the process.

While various embodiments of the present solution have been described above, it should be understood that they have been presented by way of example only, and not by way of limitation. Likewise, the various diagrams may depict an example architectural or configuration, which are provided to enable persons of ordinary skill in the art to understand example features and functions of the present solution. Such persons would understand, however, that the solution is not restricted to the illustrated example architectures or configurations, but can be implemented using a variety of alternative architectures and configurations. Additionally, as would be understood by persons of ordinary skill in the art, one or more features of one embodiment can be combined with one or more features of another embodiment described herein. Thus, the breadth and scope of the present disclosure should not be limited by any of the above-described illustrative embodiments.

It is also understood that any reference to an element herein using a designation such as "first," "second," and so forth does not generally limit the quantity or order of those elements. Rather, these designations can be used herein as a convenient means of distinguishing between two or more elements or instances of an element. Thus, a reference to first and second elements does not mean that only two elements can be employed, or that the first element must precede the second element in some manner.

Additionally, a person having ordinary skill in the art would understand that information and signals can be represented using any of a variety of different technologies and techniques. For example, data, instructions, commands, information, signals, bits and symbols, for example, which may be referenced in the above description can be represented by voltages, currents, electromagnetic waves, magnetic fields or particles, optical fields or particles, or any combination thereof.

A person of ordinary skill in the art would further appreciate that any of the various illustrative logical blocks, modules, processors, means, circuits, methods and functions described in connection with the aspects disclosed herein can be implemented by electronic hardware (e.g., a digital implementation, an analog implementation, or a combination of the two), firmware, various forms of program or design code incorporating instructions (which can be referred to herein, for convenience, as "software" or a "software module), or any combination of these techniques. To clearly illustrate this interchangeability of hardware, firmware and software, various illustrative components, blocks, modules, circuits, and steps have been described above generally in terms of their functionality. Whether such functionality is implemented as hardware, firmware or software, or a combination of these techniques, depends upon the particular application and design constraints imposed on the overall system. Skilled artisans can implement the described functionality in various ways for each particular application, but such implementation decisions do not cause a departure from the scope of the present disclosure.

Furthermore, a person of ordinary skill in the art would understand that various illustrative logical blocks, modules, devices, components and circuits described herein can be implemented within or performed by an integrated circuit (IC) that can include a general purpose processor, a digital signal processor (DSP), an application specific integrated circuit (ASIC), a field programmable gate array (FPGA) or other programmable logic device, or any combination thereof. The logical blocks, modules, and circuits can further include antennas and/or transceivers to communicate with various components within the network or within the device. A general purpose processor can be a microprocessor, but in the alternative, the processor can be any conventional processor, controller, or state machine. A processor can also be implemented as a combination of computing devices, e.g., a combination of a DSP and a microprocessor, a plurality of microprocessors, one or more microprocessors in conjunction with a DSP core, or any other suitable configuration to perform the functions described herein.

If implemented in software, the functions can be stored as one or more instructions or code on a computer-readable medium. Thus, the steps of a method or algorithm disclosed herein can be implemented as software stored on a computer-readable medium. Computer-readable media includes both computer storage media and communication media including any medium that can be enabled to transfer a computer program or code from one place to another. A storage media can be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to store desired program code in the form of instructions or data structures and that can be accessed by a computer.

In this document, the term "module" as used herein, refers to software, firmware, hardware, and any combination of these elements for performing the associated functions described herein. Additionally, for purpose of discussion, the various modules are described as discrete modules; however, as would be apparent to one of ordinary skill in the art, two or more modules may be combined to form a single module that performs the associated functions according embodiments of the present solution.

Additionally, memory or other storage, as well as communication components, may be employed in embodiments of the present solution. It will be appreciated that, for clarity purposes, the above description has described embodiments of the present solution with reference to different functional units and processors. However, it will be apparent that any suitable distribution of functionality between different functional units, processing logic elements or domains may be used without detracting from the present solution. For example, functionality illustrated to be performed by separate processing logic elements, or controllers, may be performed by the same processing logic element, or controller. Hence, references to specific functional units are only references to a suitable means for providing the described functionality, rather than indicative of a strict logical or physical structure or organization.

Various modifications to the embodiments described in this disclosure will be readily apparent to those skilled in the art, and the general principles defined herein can be applied to other embodiments without departing from the scope of this disclosure. Thus, the disclosure is not intended to be limited to the embodiments shown herein, but is to be accorded the widest scope consistent with the novel features and principles disclosed herein, as recited in the claims below.

The invention claimed is:

1. A method, comprising:
   receiving, by a wireless communication device in an active transmission configuration indicator (TCI) switching procedure, a physical data shared channel with an activation command;
   determining, by the wireless communication device, that a target TCI state is absent from an active TCI state list of the physical data shared channel;
   determining, by the wireless communication device, whether the target TCI state is known; and
   setting, by the wireless communication device, in accordance with a determination of whether the target TCI state is known, a first counter to count a number of listen-before-talk (LBT) failures in a synchronization signal block (SSB) period.

2. The method of claim 1, wherein the activation command comprises a radio resource control (RRC) activation command that includes one TCI state in the active TCI state list.

3. The method of claim 1, wherein the activation command comprises a medium access control control element (MAC CE) activation command.

4. The method of claim 1, comprising, when the target TCI state is known:
   determining, by the wireless communication device, that the first counter has reached a defined limit, wherein the first counter is configured to count the number of LBT failures in the SSB period;
   incrementing, by the wireless communication device responsive to the first counter reaching the defined limit, a second counter; and
   setting, by the wireless communication device responsive to the incrementing, the first counter to zero.

5. The method of claim 4, comprising:
   indicating, by the wireless communication device to a lower layer, to stop the active TCI state switching procedure when the SSB period is less than or equal to a defined time duration and the second counter exceeds a first threshold, or when the SSB period is more than the defined time duration and the second counter exceeds a second threshold.

6. The method of claim 4, comprising, when the second counter exceeds one of a first threshold or a second threshold:
   triggering, by the wireless communication device, beam failure recovery;
   switching, by the wireless communication device, to a downlink bandwidth part (BWP) indicated by a network;
   switching, by the wireless communication device, to a specified BWP; and
   indicating, by the wireless communication device to the network via a radio resource control (RRC) or medium access control control element (MAC CE) message, a TCI state switching failure.

7. The method of claim 4, comprising:
   setting, by the wireless communication device, the first counter and the second counter to zero, responsive to receiving a success indication for an available SSB associated with the target TCI state.

8. The method of claim 1, comprising, when the target TCI state is unknown:
   incrementing, by the wireless communication device, the first counter responsive to receiving a LBT failure indication from a lower layer, the first counter configured to count the number of LBT failures in the SSB period.

9. The method of claim 1, comprising, when the target TCI state is unknown and the active TCI state switching procedure is associated with quasi-co-location (QCL) Type D:
   determining, by the wireless communication device, that the first counter has reached a defined limit, wherein the first counter is configured to count the number of LBT failures in the SSB period;
   incrementing, by the wireless communication device responsive to the first counter reaching the defined limit, a second counter; and
   setting, by the wireless communication device responsive to the incrementing, the first counter to zero.

10. The method of claim 9, comprising:
    indicating, by the wireless communication device to a lower layer, to stop the active TCI state switching procedure when the SSB period is less than or equal to a defined time duration and the second counter exceeds a first threshold, or when the SSB period is more than the defined time duration and the second counter exceeds a second threshold.

11. The method of claim 10, comprising:
setting, by the wireless communication device, the first counter and the second counter to zero, responsive to receiving a success indication for an available SSB associated with the target TCI state.

12. The method of claim 1, comprising, when the target TCI state is unknown and the active TCI state switching procedure is associated with quasi-co-location (QCL) Type D:
incrementing, by the wireless communication device, a third counter responsive to receiving a LBT failure indication from a lower layer, the third counter configured to count a number of LBT failures in a channel state information reference signal (CSI-RS) transmission.

13. The method of claim 12, comprising:
indicating, by the wireless communication device to a lower layer, to stop the active TCI state switching procedure when the CSI-RS period is less than or equal to a defined time duration and the third counter exceeds a third threshold, or when the CSI-RS period is more than the defined time duration and the third counter exceeds a fourth threshold.

14. The method of claim 13, comprising:
setting, by the wireless communication device, the third counter to zero, responsive to receiving a success indication for an available CSI-RS associated with the target TCI state.

15. The method of claim 14, comprising:
determining, by the wireless communication device, that the first counter has reached a defined limit, wherein the first counter is configured to count the number of LBT failures in the SSB period;
incrementing, by the wireless communication device responsive to the first counter reaching the defined limit, a second counter; and
setting, by the wireless communication device responsive to the incrementing, the first counter to zero.

16. The method of claim 15, comprising:
indicating, by the wireless communication device to a lower layer, to stop the active TCI state switching procedure when the SSB period is less than or equal to a defined time duration and the second counter exceeds a first threshold, or when the SSB period is more than the defined time duration and the second counter exceeds a second threshold.

17. The method of claim 16, comprising:
setting, by the wireless communication device, the first counter and the second counter to zero, responsive to receiving a success indication for an available SSB associated with the target TCI state.

18. A wireless communication device comprising:
at least one processor configured to:
receive, via a receiver in an active transmission configuration indicator (TCI) switching procedure, a physical data shared channel with an activation command;
determine that a target TCI state is absent from an active TCI state list of the physical data shared channel;
determine whether the target TCI state is known; and
set, in accordance with a determination of whether the target TCI state is known, a first counter to count a number of listen-before-talk (LBT) failures in a synchronization signal block (SSB) period.

19. The wireless communication device of claim 18, wherein the activation command comprises a radio resource control (RRC) activation command that includes one TCI state in the active TCI state list.

20. The wireless communication device of claim 18, wherein the activation command comprises a medium access control control element (MAC CE) activation command.

* * * * *